Sept. 16, 1930.  T. TERNON ET AL  1,775,875
SIGNALING APPARATUS AT CROSSINGS
Filed Sept. 25, 1929  2 Sheets-Sheet 2
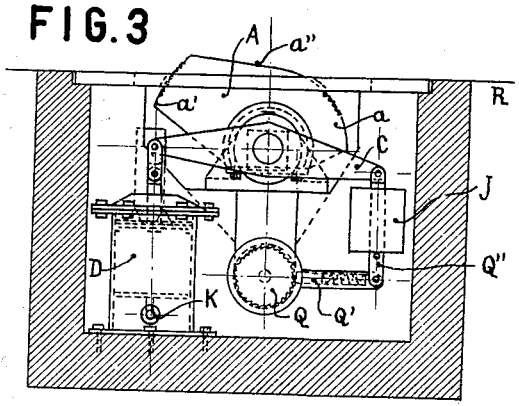
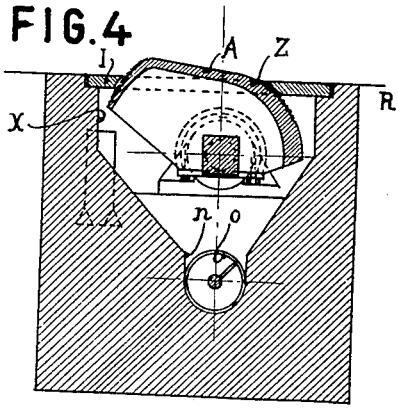
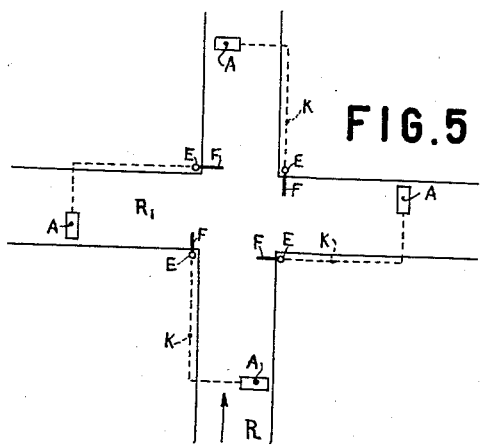
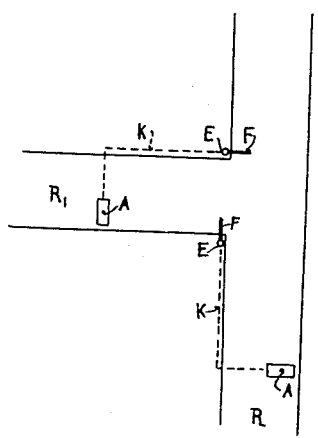

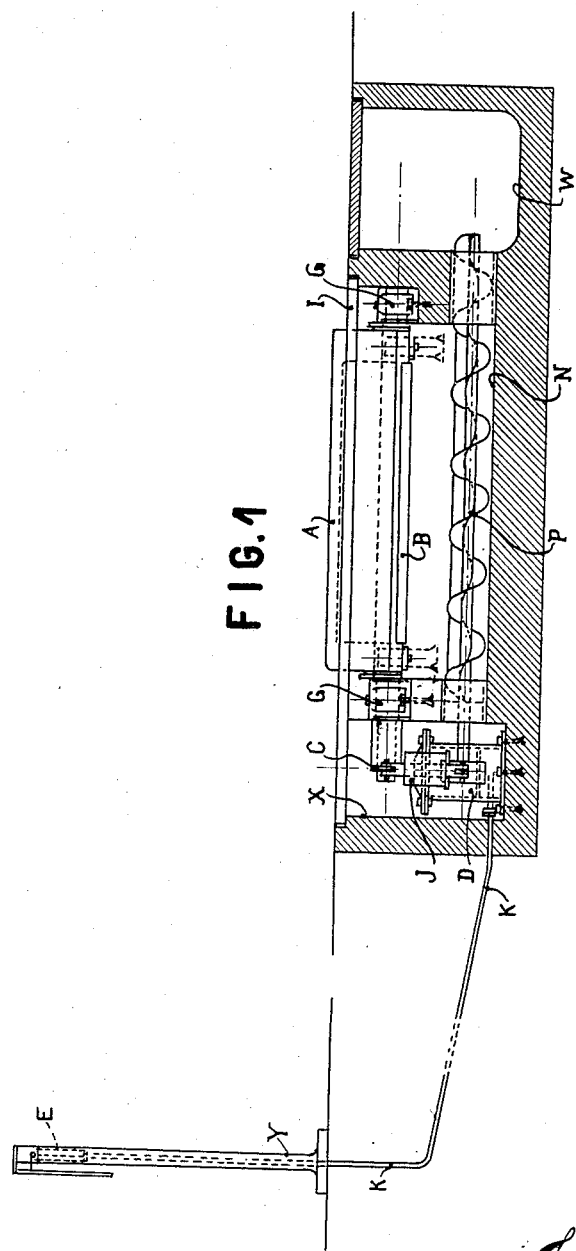
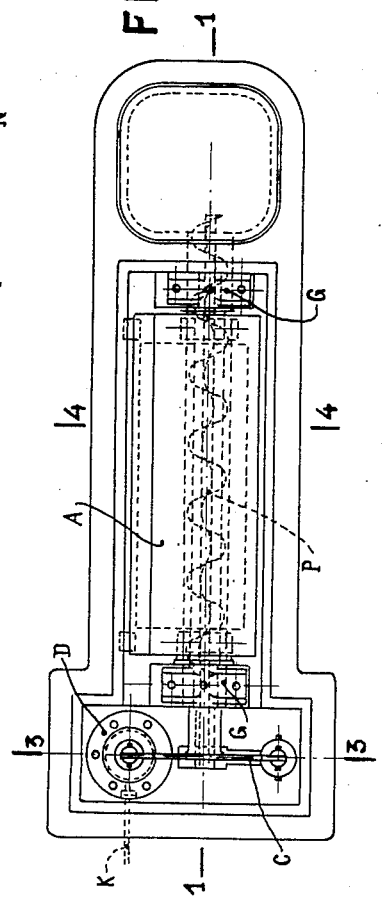

Patented Sept. 16, 1930

1,775,875

UNITED STATES PATENT OFFICE

TRANQUILLE TERNON AND EUGÈNE GALLIEN, OF FECAMP, FRANCE

SIGNALING APPARATUS AT CROSSINGS

Application filed September 25, 1929, Serial No. 395,113, and in France October 5, 1928.

The present invention relates to a device ensuring the automatic signaling of the arrival of a vehicle at a crossing, branch-line, dangerous passage and so on so as to avoid collisions, to facilitate the application of the legal traffic-prescriptions and to render at the same time possible the control of these prescriptions.

If the vehicles travel, for example, at the right side of the road, a vehicle arriving at a crossing will signal itself on the cross road at its left and is thus guarded against an accident on this side. The driver of the vehicle itself will perceive a signal indicating eventually that free passage must be given to a vehicle coming from the cross road on the right.

The whole of the signaling apparatus comprises:

An oscillating cam having a face which is substantially flush with the road surface pivotally mounted for oscillating movement by a wheel of a passing vehicle and arranged to actuate a lever acting on the stem of an air pump or any other pump to compress the fluid in a tube passing across the road and ending at and acting on another pump of less cross section at the desired place at the crossing, to operate a signal by lifting it, and hence give warning on the other road of the approach of a vehicle passing over the aforesaid cam.

The invention will be better understood by reference to the accompanying drawings showing summarily and simply in the way of an example one of the possible embodiments.

Fig. 1 is a vertical longitudinal section according to lines 1—1 of Fig. 2, through the whole device comprising the signal to be actuated.

Fig. 2 is the corresponding plan view, without the signal.

Figs. 3 and 4 represent two vertical transverse sections according to lines 3—3 and 4—4 respectively of Fig. 2.

Figs. 5 and 6 are two examples of the utilization of the device at crossings.

The mechanism effecting the lifting of the signal in an automatic way and at each passage of a vehicle approaching the crossing, is arranged below the ground in a recess perpendicular to the road and placed to the right if the circulation is effected to the right side.

This mechanism comprises an oscillating cam A which is essentially flush with the level of the road R to be protected, as described later on, and is placed about 30 meters before the crossing.

This cam or plate of a width of 0.600 meter to 1 meter according to the importance of the road, presents a section comprising two arcs of circles, $a$ and $a'$ of different radii, the arc $a$ of smaller radius being flush with the soil of the road and attaching itself to the arc $a'$ of a greater radius by an inclined path $a''$ forming a ridge of $a$ a few centimeters on the road R. The slope of $a''$ must be in the same direction as the travel of the vehicles. The cam or plate A is situated at a suitable distance from the gutter so as to cause the vehicle coming in the direction to pass with its right hand wheels thereover.

It must be remarked that in case of an accident the operated signal or the lack of this operation would afford evidence whether the vehicle kept to the right side in accordance with the traffic prescriptions or not.

The shaft B of the cam or plate is supported by two bearings G and controls, at one of its extremities, a lever C (Fig. 3). A counterweight J, with stops, returns the whole of the apparatus to its initial position at the end of the operation.

Any vehicle passing over the road plate A therefore, by its weight, causes the road plate to turn until its ridge above the ground level is flush therewith and so actuates the lever C in the same direction.

The recess X lined with masonry or concrete is covered with metal plates I readily removable for inspection. The cover plate I for the position of the road plate A has an opening (Fig. 4) which allows of the passage, with little play, of the part of the plate which forms the ridge above the road level.

The lever C is connected to an air pump D or any other fluid-pump, and its action at the passage of a vehicle over the road plate A compresses the air or the corresponding fluid in the tube K. This latter passes across the road (Fig. 5) and joins a second air pump E (Fig. 1), the stem of which, under the action of the pressure above it operates a signal F articulated on an axis. This signal F is arranged at the corner of the road $R_1$ on the left in relation to the vehicle actuating it, and can thus be seen by the driver of the latter and by any other vehicle or pedestrian coming from this left hand road $R_1$ since they know that they must give way according to the rule of the road, they can then take precautions in consequence.

The pump E and the signal F can be arranged for example at the upper part of a pillar Y so as to facilitate the vision and not to impede the circulation at the side of the road.

The road plate A at the place of its passage into the plate covering the recess has longitudinal grooves or the like Z to better carry away gravel and sand which may become interposed between these parts and render hard the actuation of the plate A by the vehicle passing above.

Beneath the road plate A is provided in the concrete a circular recess N extended by a steel tube O having its outlet at the side of the road R in the recess W. This tube O is intended for evacuating the sand and gravel which may have been drawn into the interior by the successive movements of the road plate A and by weather effects.

For this purpose, a helix P is disposed in the recess N and partly in the tube O. It carries, for example, a ratchet wheel Q with pawl Q' actuated by a rod Q'' directly connected to the lever C fixed to the shaft of the plate A. At each movement of the road plate A there will thus correspond a rotation of the helix P causing a thrust of sand and gravel into the tube O and an evacuation thereof into the pit W.

The invention is of course not limited to the embodiment represented and permits numerous modifications both with regard to the general arrangement and to details.

It is, for example, possible to modify the transmission means in accordance with the space at disposal, with the requirements of the traffic, and the points of the crossing, to be attended to.

While the foregoing description applies more particularly to the crossings of roads, it is obvious that the invention is generally utilizable for all ways to be controlled, such as branch-roads, roads to be passed in one sense only, roads and so on having a strictly regulated circulation, dangerous passages and so on.

The operating cam or road plate is always situated up the dangerous passage or part of the road to be protected, and is apt to actuate as many signals as required for an efficient signaling on the road; such optical signals may be placed either on the same road or on roads different from the one pursued by the vehicle passing over the road plate A, so as to give advertisement to vehicles approaching crossing.

At night time the signals may be eventually luminous; they may also be doubled, in case of emergency, by sonorous signals.

What we claim is:

1. Signaling apparatus of the class described, comprising a plate for application at the surface of a road and having an opening and a cam mounted for oscillation and extending through said opening, said cam having rounded ends and having an intermediate plane surface flush with said plate when the cam is in depressed position.

2. In combination with signaling apparatus for road vehicles at crossings and the like, a shaft arranged to be mounted in a recess in a road, said shaft having a cam, to be oscillated by the passing vehicle, a pump connected to said cam for actuation thereby, another pump near the signal and in operative connection therewith, and a conduit between both pumps, to cause the fluid from one pump to operate the other pump, and hence actuate the signal.

3. In combination with signaling apparatus for road vehicles at crossings and the like, a cam arranged to be oscillated by a wheel of a passing vehicle, a pump acted upon by said cam, a pump by the said signal, arranged to be acted upon by the fluid of the first pump, means to restore the whole to initial position after cessation of said passage, and means to remove bodies interfering with the operation of said apparatus.

In witness whereof they affix their signatures.

TRANQUILLE TERNON.
EUGÈNE GALLIEN.